United States Patent [19]

Taylor

[11] Patent Number: 4,886,603
[45] Date of Patent: Dec. 12, 1989

[54] METHOD AND APPARATUS FOR WATER DECONTAMINATION

[75] Inventor: John A. Taylor, Pinckney, Mich.

[73] Assignee: Separation Dynamics, Inc., Southfield, Mich.

[21] Appl. No.: 306,564

[22] Filed: Feb. 6, 1989

[51] Int. Cl.⁴ ............................................. B01D 13/00
[52] U.S. Cl. ................................ 210/641; 210/195.2; 210/295
[58] Field of Search ............... 210/641, 793, 708, 749, 210/295, 195.2

[56] References Cited

U.S. PATENT DOCUMENTS 4,790,941 12/1988 Taylor ................................. 210/639
4,814,087 3/1989 Taylor ................................. 210/641

Primary Examiner—Frank Spear
Attorney, Agent, or Firm—Reising, Ethington, Barnard, Perry & Milton

[57] ABSTRACT

An apparatus for continually separating water and water souble substances and hydrocarbons and/or halogenated hydrocarbons from contaminated water includes first and second separator modules (12,14) for separating a water and water soluble substance permeate and pure hydrocarbon and halogenated hydrocarbon permeate from a contaminated water retentate. A fluid conducting circuit: (a) conducts water contaminated with hydrocarbons and/or halogenated hydrocarbons to the first separator module (12), (b) conducts a portion of the first contaminated retentate and a portion of a second contaminated retentate back to the first separator module (12) (c) and conducts another portion of the first contaminated retentate and another portion of the second contaminated retentate to the second separator module (14). The invention provides a method of utilizing the apparatus for continuously separating water and hydrocarbons and/or halogenated hydrocarbons from contaminated water.

12 Claims, 1 Drawing Sheet

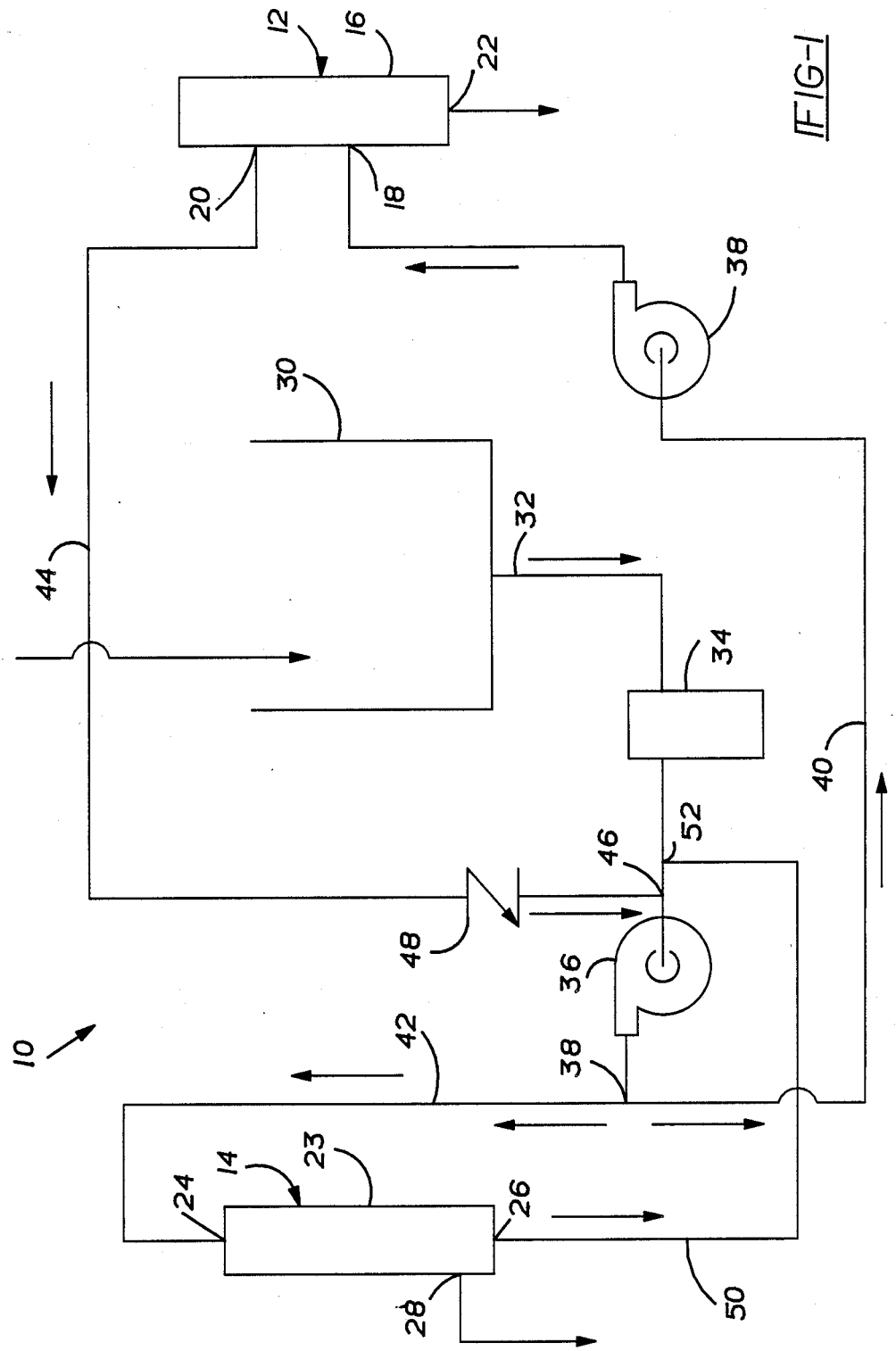

METHOD AND APPARATUS FOR WATER DECONTAMINATION

TECHNICAL FIELD

The present invention relates to a process and apparatus for recovering clean water and reusable hydrocarbons and halogenated hydrocarbons from contaminated water. More specifically, the present invention provides a method and apparatus for the continual concentration of contaminates during the simultaneous removal of water and reusable hydrocarbons and/or halogenated hydrocarbons therefrom.

BACKGROUND ART

Recently, there has been aggressive development by the assignee of the present invention in the use of hollow fiber membranes for the separation of water and hydrocarbons and/or halogenated hydrocarbons. The U.S. Pat. No. 4,790,941 to John A. Taylor, issued Dec. 13, 1988 and assigned to the assignee of the present invention discloses a method and apparatus for fluid decontamination. The invention provides a process and apparatus for removing corrosive contaminates from hydrocarbon fluids utilizing a separator module comprising a plurality of hollow fiber membranes. The membranes are hollow hydrophobic microporous membrane fibers contained in a bundle within a web. U.S. Ser. No. 194,984 to Taylor, filed May 17, 1988, and also to the assignee of the present invention, discloses an apparatus and method of separating water from a water and hydrocarbon or halogenated hydrocarbon mixture. The invention utilizes a membrane bundle consisting of nonporous selfsupported hollow fibers of cuproammonium cellulose.

Contamination of water with hydrocarbons and halogenated hydrocarbons is a wide spread problem throughout the world. Surface and ground water supplies near industrial operations contain difficult to remove oily contamination. Such installations as petroleum refineries, industrial operations, oil field operations, and oil and gas pipe lines contain water contaminated with hydrocarbon and halogenated hydrocarbon compounds. Often, polychlorinated biphenyl compounds (PCB's) are found as contaminates in water supplies as well. These problems have been present for a significantly long period of time and have not been solved by the existing technology.

For example, the U.S. Pat. No. 3,735,558 to Skarstrom et al discloses a process for separating fluids and an apparatus to be used therewith. The apparatus separates water vapor from air by creating a pressure gradient across the walls of permeable tubes to induce permeation therethrough. A countercurrent reflux flow induces a longitudinal concentration gradient along the walls of permeable tubes which enhance permeation of key components through the walls of the tubes thereby separating them from a mixed fluid feed. The Japanese patent Nos. 13,653 issued Feb. 1, 1979 and 152,679 issued Dec. 1, 1979 both disclose the use of cuproammonium rayon to selectively pass water vapor therethrough. Even though these prior art separation devices have been in existance for over 10 years, the problems of water decontamination have remained unsolved. These are not minor problems, but rather major commercial and environmental problems which industry and government have not been able to solve. There does not presently exist, based on the known prior art, a method or apparatus for reclaiming pure water from water contaminated with hydrocarbons and halogenated hydrocarbons and which process can also concentrate pure hydrocarbons, halogenated hydrocarbons, or mixtures of these products for recovery or disposal.

It is an object of the present invention to combine the separation modules which applicant has previously novelly utilized in novel separation systems in conjunction with a presently novel fluid circuit to reclaim pure water from water contaminated with hydrocarbons and halogenated hydrocarbons and which process can also concentrate such pure hydrocarbons, halogenated hydrocarbons, or mixtures of these products for recovery or disposal. The present invention requires no ancillary equipment such as coalescers, centrifuges, distalation columns, vacuums, activated carbon, or heat energy to fully accomplish the isolation and purification of water and the recovery and reclamation of the contaminates.

SUMMARY OF THE INVENTION

In accordance the present invention, there is provided an apparatus for continuously separating water and water soluble substances, and hydrocarbons and/or halogenated hydrocarbons from contaminated water, the apparatus including first separator means for separating water and water soluble substances permeate from a first contaminated retentate and second separator means for separating a pure hydrocarbon and/or halogenated hydrocarbon permeate from a concentrated second contaminated retentate. Fluid flow conducting means conducts a flow of contaminated water to at least one of the separator means. Retentate recycle means recycles the flow of the first and second retentates between the first and second separator means.

The invention further provides a method of continuously separating water and water soluble substances and hydrocarbons and/or halogenated hydrocarbons from contaminated water. The method includes the steps of conducting a flow of contaminated water, separating a water and water soluble substances permeate at a first separator module and a hydrocarbon and/or halogenated hydrocarbon permeate at a second separation module from a retentate of concentrating contaminated water, and recycling the retentate flow between the separation modules.

FIGURE IN THE DRAWINGS

Other advantages of the present invention will be readily appreciated as the same becomes better understood by reference to the following detailed description when considered in connection with the accompanying drawing wherein FIG. 1 is schematic diagram of a fluid separation circuit constructed in accordance with the present invention.

DETAILED DESCRIPTION OF THE INVENTION

An apparatus constructed in accordance with present invention is generally shown at 10 in the drawing. The apparatus has the capacity for simultaneous separation of water and water soluble substances and separately, the recovery of hydrocarbons and halogenated hydrocarbons and for the concentration of contaminates from contaminated water. By contaminated water, it is meant water contaminated with hydrocarbons, halogenated hydrocarbons or other soluble and insoluble particulates such as bacteria, algae, or minerals.

The term water permeate refers to water containing water soluble substances but not containing any particulate matter or contaminating hydrocarbons or halogenated hydrocarbons.

Examples of hydrocarbons are middle distillates from a petroleum refinery operation, hydraulic fluids such as those employed in the actuation and operation of fluid power equipment such as lifts in gas stations and actuators for rudders of airplanes. Examples of halogenated hydrocarbons are trichlorofluoromethane, dichloroethane, trichloroethane, tetrachloroethane, carbon tetrachloride, and all Freon TM type chloroflorinated compounds. The hydrocarbons can also be lubricating type oils of varying viscosities.

Generally, the apparatus 10 includes first separator means generally indicated at 12 for separating pure water permeate from a first contaminated retentate, second separator means generally indicated at 14 for separating a pure hydrocarbon and/or halogenated hydrocarbon permeate from a concentrated second contaminated retentate, and a fluid conducting circuit which provides generally three functions. The fluid conducting circuit conducts water contaminated with hydrocarbons and/or halogenated hydrocarbons to the first separator module 12, (b) conducts a portion of the first contaminated retentate and a portion of the second contaminated retentate to the first separator module 12, and conducts another portion of the first contaminated retentate and another portion of the second concentrated contaminated retentate to the second separator module 14. Thusly, the retentates are recycled and mixed between the two separator modules 12,14.

More specifically, the first separator module 12 includes an outer housing 16 having an inlet port 18, retentate outlet port 20 and permeate outlet port 22. Within the housing 16 is contained a bundle of hollow hydrophilic fibers, preferably made of regenerated cellulose. By regenerated cellulose, it is meant that the cellulose used is cuproammonium regenerated cellulose. The cuproammonium regenerated cellulose fibers are tubular walls which are featureless and nonporous membranes. Such a module is disclosed in detail in co-pending patent application Ser. No. 194,984 to Taylor, filed May 17, 1988 and assigned to the assignee of the present invention. However, the housing 16 is different from that disclosed in aforementioned patent application in that it includes a fluid inlet 18, a retentate outlet 20 and a single permeate outlet 22. Pumping means, not shown, pumps the water permeate from the permeate outlet 22.

The second separator module 14 comprises a housing 23 including a fluid inlet 24 a retentate outlet 26 and a single permeate outlet 28. The housing 23 of the separator module 14 contains a plurality of hollow fiber membranes, not shown in the drawing. The membranes are contained within a plastic web such as disclosed in the U.S. Pat. No. 4,790,941 to Taylor, and assigned to the assignee of the present invention. Module housing 23 contains a plurality of hollow hydrophobic microporous membrane fibers. Each fiber includes a hollow core having an inner surface extending about the hollow core. Each fiber also includes an outer surface.

The membrane fibers of the second separator module are microporous membranes separating the inner bores thereof from the outer chamber defined by the housing 23 surrounding the fibers. Each fiber can comprise a homogenous layer of a microporous material made from hydrophobic materials such as polyethylene, polypropylene, polyvinylidene, and tetrafluoroethylene fluorocarbon resins. The resins included in this group must be extremely resistant to degradation in the presented environment of hydrophilic elements such as water and dissolved water soluble components, as well as in the hydrocarbon environment of the fluids.

In either of the separation modules 12 and 14, inlet flow from inlets 18 and 24 may flow through the inner cores of the hollow fibers, the retentate flow exiting outlets 20,26 respectively and the permeate flow exiting outlets 22,28 respectively. Alternatively, the present invention can function with the inlet flow from inlets 18 and 24 flowing over the outer surface of the hollow fiber membranes, the permeate flowing from the cores of the membranes to permeate outlets 22,28 respectively. In other words, whether the direction of flow across the fibers is not critical.

The fluid circuit can include a reservoir 30. The reservoir 30 may be a actual structure for containing water contaminated with hydrocarbons and/or halogenated hydrocarbons or it could be in the form of a lake bed, or other contaminated areas. The conducting means of the present invention includes an inlet conduit 32 in fluid communication with the reservoir 30. Thusly, the inlet conduit 30 may be a conduit in fluid communication with a reservoir housing or could be a pipe line directly from an on field source, such as a lake or other area having ground water contaminated With hydrocarbons or halogenated hydrocarbons. A strainer 34 is operatively connected to the inlet conduit 32 for removing gross and fine particulate material which may be present in the contaminated water. Pump 36 is also operatively connected to inlet condit 32 for pumping the contaminated water therethrough.

A fluid flow dividing connector is located at 38 for dividing the inlet flow of contaminated water into two inlet flows, a first going through conduit 40 to the first separator module 12 and a second conduit 42 operatively connected to the second separator module 14. A second pump 38 is operatively connected to the second conduit 40 for pumping the fluid therethrough to the fluid inlet 18 of the first separator module 12. Conduit 44 is operatively connected between the retentate outlet 20 of the first separator module 12 and the inlet conduit 32, the connection being at 46. A check valve 48 is operatively connected to the conduit 44 for preventing back flow therethrough. In other words, the fluid flow through conduit 34 is unidirectional towards the inlet conduit 32. Conduit 50 is operatively connected between the retentate outlet 26 of the second separator module 14 and a connection 52 to the inlet conduit 32.

In operation, the subject apparatus provides a method of continouously separating water and water soluble substances and hydrocarbons and/or halogenated hydrocarbons from contaminated water. Generally, the method includes the steps of conducting water contaminated with hydrocarbons and/halogenated hydrocarbons to the first separator module 12 through inlet conduit 32 and conduit 40. A water and water soluble substances permeate is I0 separated through the fibers within the first separation module 12 and eliminated through outlet 22 while a first contaminated retentate is removed through outlet 20. A portion of the first contaminated retentate is conducted to the microporous hollow fibers in the second separator module 14 through conduit 44 as divided at the T-connection 38 and conducted through conduit 42 to inlet 24. A pure hydrocarbon and/or halogenated hydrocarbon permeate is separated from a concentrated second contaminated retentate. The pure hydrocarbon and/or halogenated hydrocarbon permeate is removed through permeate outlet 28 while the concentrated second contaminated retentate leaves the second separator module 14 through outlet 26. The retentate is carried through conduit 50 back to the inlet conduit 32. This flow, in combination with the inlet flow from the reservoir 30 and with the contaminated retentate flow entering the inlet conduit 32 at connection 46 is pumped by pump 36 and divided at the T-connection 38 into a portion which is conducted through conduit 40 to the first separator module 12. The other portion of the second concentrated contaminated retentate is carried with a portion of the first contaminated retentate and with fluid from the reservoir 30 back to the second separator module 14.

Thusly, the invention provides a two stage separation process which first exposes the water contaminated with hydrocarbons and/or halogenated hydrocarbons to a membrane separation device that contains hollow fiber membranes permeable to water but not to hydrocarbons. Such membranes are nonporous and may be of the cuproammonium regenerated cellulose type as discussed above. The permeate from stage one separation is purified water free of hydrocarbons. The retentate, composed of both water and retained hydrocarbon contaminates is then pumped on the inside of microporous hollow fibers. The second stage separation module 14 is capable of removal of hydrocarbons suspended in the contaminated water. Thus, the second stage of the process is capable of continuous removal and reclamation of any hydrocarbons and/or halogenated hydrocarbons present in the water which may then be reprocessed back through the refinery into commercial valuable products, or conveniently isolated as a concentrate for disposal.

A typical application of the present invention is the removal of a middle distillite hydrocarbon from water taken from a petroleum refinery operation. It is a common practice to utilize water, often in the form of a stream, in the production of commercial products such as diesel fuel. Steam is used to remove unwanted volatile hydrocarbon products from diesel fuel, and in the process, the condensate water becomes contaminated with various hydrocarbons molecules.

EXAMPLES

Example 1

Separation of Water from Water Contaminated with Diesel Fuel

A sample of water contaminated with 3% diesel fuel was exposed to the SDI 2-stage hollow fiber membrane separation system constructed in accordance with the present invention by recirculation of the contaminated water through a SDI hollow fiber module having nonporous membrane. Samples of purified permeate water were collected from stage one and saved for analysis. No heat, vacuum, centrifugation or any means other than the SDI membrane was employed to affect separation of the oil from the water. The retentate from stage one was continuously recirculated through a second SDI microporous type separation in stage two of the system. Pure diesel fuel was collected from stage two of the SDI process.

Results (1) The appearance of the diesel oil contaminated water before separation was light brown in color and opaque. The oil appeared to be strongly emulsified in the water. Appearance of the purified water from the water contaminated by the diesel oil after separation by the stage 1 membrane was glass clear and colorless.

The contaminated oily water concentrate leaving the stage one hollow fiber separator was continuously pumped through the bores of microporous polyvinyledene flouride (PVDF) hollow fiber module capable of separation of the oil as the permeate. The stage two hydrophobic microporous hollow fiber module allowed for the collection of the concentrated diesel oil, which flowed through the pores of the membrane into a collection container.

(2) Chemical analysis showed no hydrocarbon detectable in the SDI purified water samples. No odor was detected in the pure water samples after passing through the SDI membrane.

Example 2

Separation of Trichloroethane from Water

A sample of water containing approximately 500 ppm of trichloroethane was exposed to the stage 1 membrane using the same procedure as that employed with the separation of diesel oil from water. The appearance of the water contaminated with trichloroethane appeared clear and colorless but with a slight odor of trichloroethane.

Results

Water samples collected after passing through the stage 1 membrane were shown by chemical analysis to contain no detectable trichloroethane. The purified water samples were odorless.

A clear fluid issued from the stage two microporous membrane separator module that had a strong odor of trichloroethane. Chemical analysis determined the fluid to be trichloroethane.

In both examples, the two stage separation system was continually exposed to the crude oil and trichloroethane contaminated water for 12 weeks. No reduction in water flux rate was observed and there was no sign of membrane degradation. The surfaces of the membrane did not appear to have collected a deposit of oil or indicate any tendency to foul, nor were there any signs of chemical degradation of the membranes.

What is claimed is:

1. A method of continuously separating water and water soluble substances and hydrocarbons and/or halogenated hydrocarbons from contaminated water, said method including the steps of: conducting a flow of contaminated water; separating a water and water soluble substances permeate at a first separation module and a hydrocarbon and/or halogenated hydrocarbon permeate at a second separation module from a retentate flow of concentrating contaminated water; and recycling the retentate flow between the separation modules.

2. A method as set forth in claim 1 further including the step of selectively adding contaminated water to the recycling retentate flow.

3. A method as set forth in claim 2 wherein said conducting and separating steps are further defined as conducting water contaminated with hydrocarbons and/or halogenated hydrocarbons to the first separator module containing nonporous cuproammonium cellulose hollow fiber membranes; separating a water and water soluble substances permeate through the fibers from a first contaminated retentate; conducting a portion of the first contaminated retentate to a microporous hollow fiber second separator module and recycling a second portion of the first contaminated retentate to the first separation module; separating a hydrocarbon and/or halogenated hydrocarbon permeate from a concentrated second contaminated retentate; and conducting a portion of the second concentrated contaminated retentate with the recycling portion of the first contaminated retentate to the first separator module and recycling another portion of the second concentrated contaminated retentate with the other first contaminated retentate portion to the second separator module.

4. A method as set forth in claim 3 wherein said first mentioned conducting step is further defined as pumping a flow of contaminated water from a reservoir to the first separator.

5. A method as set forth in claim 3 wherein said second mentioned conducting step is further defined a pumping a flow of the first contaminated retentate to a T-tube and dividing the flow into the two flow portions conducted to the first and second separator modules respectively.

6. A method as set forth in claim 5 wherein said third mentioned conducting step is further defined as combining the concentrated second contaminated retentate flow with the flow of contaminated water and the flow of the first contaminated retentate in a single combined flow and pumping the single combined flow to the T-tube and dividing the combined flow into the two flow portions conducted to the first and second separator modules, respectively.

7. An apparatus (10) for continuously separating water and water soluble substances and hydrocarbons and/or halogenated hydrocarbons from contaminated water, said apparatus (10) comprising: first separator means (12) for separating water and water soluble substances permeate from a first contaminated retentate; second separator means (14) for separating a hydrocarbon and/or halogenated hydrocarbon permeate from a concentrated second contaminated retentate; fluid flow conducting means for conducting a flow of contaminated water to at least one of said first and second separator means; and retentate recycling means for recycling the flow of the first and second contaminated retentates between said first and second separator means.

8. An apparatus as set forth in claim 7 wherein said recycling means includes conduit means for conducting water contaminated with hydrocarbons and/or halogenated hydrocarbons to said first separator means (12), recycling a portion of the first contaminated retentate and conducting a portion of the second contaminated retentate to said first separator means (12), and conducting another portion of the first contaminated retentate and another portion of the second concentrated contaminated retentate to said second separator means (14).

9. An apparatus as set forth in claim 7 wherein said conducting means includes an inlet conduit operatively connected to said first and second separator means (12,14) and having flow dividing means for dividing an inlet flow of contaminated water into two inlet flows to said first and second separator means, respectively.

10. An apparatus as set forth in claim 9 wherein said conducting means further includes a second conduit operatively connected between said first separator (12) means and said inlet conduit upstream of said flow divider means for conducting flow of said first contaminated retentate therebetween and a third conduit operatively connected between said second separator means (14) and said inlet conduit upstream of said flow dividing means for conducting the flow of the concentrated second contaminated retentate therebetween thereby recirculating and mixing the first and second retentate flows with the inlet flow as said first and second separator means (12,14) concentrates the flows.

11. An apparatus as set forth in claim 10 including first pumping means operatively connected to said inlet conduit upstream of said flow dividing means and downstream of the connection of said second and third conduits to said inlet conduit for pumping the fluid flow through said inlet conduit and from said second and third conduits.

12. An apparatus as set forth in claim 1 further including a fourth conduit operatively connected between said flow dividing means and said first separator means and a fifth conduit operatively connected between said flow dividing means and said second separator means and second pumping means operatively connected to said fourth conduit for pumping fluid therethrough.

* * * * *